United States Patent
Poulos et al.

(10) Patent No.: US 9,870,667 B2
(45) Date of Patent: *Jan. 16, 2018

(54) APPENDING AUDIT MARK IMAGE

(75) Inventors: John Poulos, Toronto (CA); James Hoover, Montreal (CA); Nick Ikonomakis, Toronto (CA); Goran Obradovic, Toronto (CA)

(73) Assignee: Dominion Voting Systems, Inc., Denver, CO (US)

( * ) Notice: Subject to any disclaimer, the term of this patent is extended or adjusted under 35 U.S.C. 154(b) by 911 days.

This patent is subject to a terminal disclaimer.

(21) Appl. No.: 13/525,208

(22) Filed: Jun. 15, 2012

(65) Prior Publication Data

US 2012/0259681 A1 Oct. 11, 2012

Related U.S. Application Data (63) Continuation of application No. 13/463,536, filed on May 3, 2012, which is a continuation of application No. 11/121,997, filed on May 5, 2005, now Pat. No. 8,195,505.

(30) Foreign Application Priority Data

May 5, 2004 (CA) ...................................... 2466466

(51) Int. Cl.
  *G07C 13/00* (2006.01)
  *G06Q 20/38* (2012.01)
  *G06Q 20/40* (2012.01)

(52) U.S. Cl.
  CPC ........... *G07C 13/00* (2013.01); *G06Q 20/382* (2013.01); *G06Q 20/401* (2013.01)

(58) Field of Classification Search
  CPC ......... G06Q 30/0207–30/0277; G06Q 20/382; G06Q 20/401; G07C 13/00
  USPC .......................................................... 705/12
  See application file for complete search history.

(56) References Cited

U.S. PATENT DOCUMENTS

| | | | |
|---|---|---|---|
| 6,250,548 B1 | 6/2001 | McClure et al. | |
| 7,406,480 B2 * | 7/2008 | Seibel | .................... G07C 13/00 |
| 2002/0143610 A1 | 10/2002 | Munyer | |
| 2003/0052981 A1 * | 3/2003 | Kakarala | ............... G06T 3/4007 348/272 |

(Continued)

OTHER PUBLICATIONS

Requisition by the Examiner for Canadian Application No. 2,466,466 dated Jul. 8, 2015, from the Canadian Intellectual Property Office.

*Primary Examiner* — Chrystina E Zelaskiewicz
(74) *Attorney, Agent, or Firm* — Holland & Hart LLP (57) ABSTRACT

A system, method and computer program for tabulating votes and creating an audit trail is provided. A ballot processing device may include a paper feed mechanism, a computer, a ballot processing application loaded on the computer, and a digital scanning device linked to the computer. The ballot processing application may process the digital image to establish a series of processing results defining one or more voting results for the paper ballot, and also an audit trail. The ballot processing application may process the digital image to define the voting results based on criteria established by election officials, including ambiguous mark criteria. The audit trail enables election officials to verify that particular paper ballots have been processed correctly in accordance with these criteria.

20 Claims, 7 Drawing Sheets

(56) References Cited

U.S. PATENT DOCUMENTS

2003/0173404 A1    9/2003    Chung et al.
2007/0170253 A1*    7/2007    Chung ............... G06K 7/10346
                                                        235/386

* cited by examiner

City of Anywhere
General Municipal Election
January 1 1891

To vote, completely fill in the box(es) ☐ next to your choice(s), like this: ■

DRO

BALLOT FOR THE OFFICE OF MAYOR
Vote for only ONE (1) candidate

1) Robert L.     BORDON ☐
2) Jean          CABOT ☐
3) Jacques       CARTIER ☐
4) Samuel de     CHAMPLAIN ☐
5) James         COOK ☐
6) Leif          ERIKSSON ☐
7) John          FRANKLIN ☐
8) Henry         HUDSON ☐
9) Jake          JOLIET ☐
10) William L.M. KING ☐
11) Wilfrid      LAURIER ☐
12) John A.      MacDONALD ☐
13) Lester B.    PEARSON ☐
14) Louis S.     SAINT-LAURENT ☐
15) Pierre E.    TRUDEAU ☐
                          ☐

BALLOT FOR THE OFFICE OF COUNCILLOR
Vote for ONE (1) 1st choice & ONE (1) 2nd choice, as shown at right Candidate 1 ☐ ☐
Candidate 2 ■ ☐
Candidate 3 ☐ ■

1st  2nd
1) Miles J.     MASSEY ☐ ☐
2) Menelaus P.  O'DANIEL ☐ ☐
3) Clause       VON ESPIE ☐ ☐

BALLOT FOR THE OFFICE OF ALDERMAN
Vote for up to THREE (3) candidates

1) Emily      CARR
2) Jeanne     MANCE
3) Nellie     McCLUNG
4) Lucy M.    MONTGOMERY
5) Mary       PICKFORD
6) Fanny      ROSENFELD

☐ ☐ ☐ ☐ ☐ ☐

City of Anywhere
General Municipal Election
January 1 1891

DRO: *J.S.*

To vote, completely fill in the box(es) ☐ next to your choice(s), like this: ■

BALLOT FOR THE OFFICE OF MAYOR
Vote for only ONE (1) candidate

1) Robert L. BORDON ☐
2) Jean CABOT ☐
3) Jacques CARTIER ☐
4) Samuel de CHAMPLAIN ☐
5) James COOK ☐
6) Leif ERIKSSON ☐
7) John FRANKLIN ☐
8) Henry HUDSON ☐
9) Jake JOLIET ☐
10) William L.M. KING ☐
11) Wilfrid LAURIER ☐
12) John A. MacDONALD ☐
13) Lester B. PEARSON ☐
14) Louis S. SAINT-LAURENT ☐
15) Pierre E. TRUDEAU ☐
Nick Salvator ■

BALLOT FOR THE OFFICE OF COUNCILLOR
Vote for ONE (1) 1st choice & ONE (1) 2nd choice, as shown at right Candidate 1 ☐ ☐
Candidate 2 ■ ☐
Candidate 3 ☐ ■

1st  2nd
1) Miles J.   MASSEY ■ ☐
2) Menelaus P. O'DANIEL ☐ ■
3) Clause VON ESPIE ☐ ☐

BALLOT FOR THE OFFICE OF ALDERMAN
Vote for up to THREE (3) candidates

1) Emily CARR ☐
2) Jeanne MANCE ■
3) Nellie McCLUNG ☐
4) Lucy M. MONTGOMERY ■
5) Mary PICKFORD ■
6) Fanny ROSENFELD ■

---

DRO: 2109

Office of Mayor: 0,0,0,1,0,0,0,0,1,0,0,0,0,1,0,78D
Vote for: Nick Salvator

Office of Councillor: (800,0), (1,790), (0,0)
Vote for: Miles J. MASSEY (1st), Menelaus P. O'DANIEL (2nd)

Office of ALDERMAN: 2,812,2,823,788,774
Vote for: OVER-VOTE

City of Anywhere
General Municipal Election
January 1 1891

DRO
*J.S.*

To vote, completely fill in the box(es) ☐ next to your choice(s), like this: ■

| BALLOT FOR THE OFFICE OF | MAYOR |
|---|---|
| Vote for only ONE (1) candidate | |
| 1) Robert L. | BORDON ☐ |
| 2) Jean | CABOT ☐ |
| 3) Jacques | CARTIER ☐ |
| 4) Samuel de | CHAMPLAIN ☐ |
| 5) James | COOK ☐ |
| 6) Leif | ERIKSSON ☐ |
| 7) John | FRANKLIN ☐ |
| 8) Henry | HUDSON ☐ |
| 9) Jake | JOLIET ☐ |
| 10) William L.M. | KING ☐ |
| 11) Wilfrid | LAURIER ☐ |
| 12) John A. | MacDONALD ☐ |
| 13) Lester B. | PEARSON ☐ |
| 14) Louis S. | SAINT-LAURENT ☐ |
| 15) Pierre E. | TRUDEAU ☐ |
| Nick Salvator | ■ |

BALLOT FOR THE OFFICE OF COUNCILLOR

Vote for ONE (1) 1st choice & ONE (1) 2nd choice, as shown at right

| | 1st | 2nd |
|---|---|---|
| Candidate 1 | ☐ | ☐ |
| Candidate 2 | ■ | ☐ |
| Candidate 3 | ☐ | ■ |

| | | 1st | 2nd |
|---|---|---|---|
| 1) Miles J. | MASSEY | ■ | ☐ |
| 2) Menelaus P. | O'DANIEL | ☐ | ■ |
| 3) Clause | VON ESPIE | ☐ | ☐ |

BALLOT FOR THE OFFICE OF ALDERMAN
Vote for up to THREE (3) candidates

| 1) Emily | CARR | ☐ |
| 2) Jeanne | MANCE | ■ |
| 3) Nellie | McCLUNG | ☐ |
| 4) Lucy M. | MONTGOMERY | ■ |
| 5) Mary | PICKFORD | ■ |
| 6) Fanny | ROSENFELD | ■ |

DRO: 2109

Office of Mayor: 0,0,0,1,0,0,0,0,1,0,0,0,0,1,0,78D
Vote for: Pierre E. TRUDeau

Office of Councillor: (800,0), (1,790), (0,0)
Vote for: Miles J. MASSEY (1st), Menelaus P. O'DANIEL (2nd)

Office of ALDERMAN: 2,812,2,823,788,726
Vote for: OVER-VOTE

FIG. 6

APPENDING AUDIT MARK IMAGE

CROSS REFERENCES

This application is a continuation of U.S. patent application Ser. No. 13/463,536 which was filed on May 3, 2012, and entitled "System and Computer Program for Vote Tabulation with an Electronic Audit Trail"; which is a continuation of U.S. patent application Ser. No. 11/121,997 filed May 5, 2005, now Pat. No. 8,195,505, issued Jun. 5, 2012, and entitled "System, Method and Computer Program for Vote Tabulation with an Electronic Audit Trail"; which claims priority to Canadian Patent Application No. 2,466,466, filed May 5, 2004, and entitled "System, Method and Computer Program for Vote Tabulation with an Electronic Audit Trail"; the entire disclosures of which are incorporated herein by reference.

FIELD OF INVENTION

This invention relates generally to technologies for tabulating votes. This invention relates more particularly to ballot boxes with vote tabulation capabilities. The invention also relates to method for tabulating votes in an election.

BACKGROUND OF THE INVENTION

Numerous voting technologies are known. These technologies are generally directed to permitting votes to be recorded with efficacy while maintaining the secrecy of the ballot.

One category of voting technology involves the use of the paper ballot. Various methods exist for collecting and tabulating votes recorded by paper ballots. Prior art has been created to rely on paper ballots while using modern digital technology. For example, "Optical-mark Based Systems" allow voters to mark paper ballots and feed the ballots through an automated optical ballot scanning tabulator into sealed ballot boxes. The optical scanning technology determines the nature of the vote and the computer technology provides a means to quickly tabulate results. The results are transmitted to a central computer by a variety of transmission technologies. All results are tallied at the central computer.

Another category of voting technology is best described as "Mechanical Voting Systems". These systems generally utilize mechanical counters for counting votes. These systems include lever machines and punch card ballots.

Another category of voting technology is the "Direct Recording Electronic" (DRE) system. This type of system permits voters to enter their vote into a digital system by means of an electronic interface such as a touch screen, mouse or scrolling cursor. Generally speaking, an interface device in each voting station is linked to a computer system. The results compiled by each set of voting stations are then transmitted to a central computer system using a variety of computer architectures and transmission modes.

In a variation of the DRE system, the entry of a vote into a digital system is linked to a paper receipt that is used as a voter verified paper receipt. This paper receipt can be used in a paper-based audit procedure—an operation that is impossible in a true DRE system.

There is a need for voting technologies that provide the ability to audit the election results. Democracy depends on accurate and incorruptible tabulation of voter intent; so by extension, voting technologies must be able to demonstrate vote tabulation integrity.

One of the challenges in permitting efficient verification of voting results, and also demonstration of the integrity of the vote, are the subjective elements generally involved in determining voter intent.

In accordance with numerous prior art voting technologies, the assessment of what constitutes a vote in favour of a particular candidate or a particular answer to a question is determined by subjective assessment.

This is best illustrated in the context of a manual hand count. Historically, voters would select their candidates using pen and paper, making a mark (an 'X' for example) beside the candidate(s) of their choice. This paper ballot would then be manually counted by election officials with candidates and their agents allowed to scrutinize the operation. However, by the very nature of elections, different parties involved with elections have very different interests. A set of candidates and their agents rarely share common motivation and accordingly the interpretation process of what constitutes a mark on a ballot has always been prone to inconsistencies. This fact generally makes it difficult to achieve the same tally when counting the same ballots multiple times, as there is no assurance that any given ballot would be interpreted the same way by every interested party. The reason for this is straightforward: often the voter would make a mark that could be deemed as ambiguous by any one of the people involved with the manual ballot count (i.e. election official or candidate agent). What may be obvious to one agent may not be obvious to another agent. In addition, many ballots were deemed 'spoiled' or 'blank' because the voter (either intentionally or unintentionally) made too many or too few marks on the ballot.

The apparent lack of objectivity was addressed in a number of prior art systems. The Mechanical Based Systems and Optical-Mark Based Systems either incremented a particular vote or not based on objective standards.

The Mechanical Based Systems have been deemed susceptible to inconsistencies in well publicized cases. For example, some mechanical punch systems have been shown to leave cut-out 'chads' partially attached, leading to disputes surrounding election results.

Also, in the case of Mechanical Based Systems and Optical-Mark Based Systems, the objective standards for what constitutes an indication of voter intention are generally set by the manufacturer of the voting device and have not been adaptable to conform to objective standards determined by election officials for a particular vote. For example, in Optical-Mark Based Systems an integration threshold is usually defined to establish how dark a mark has to be in order to constitute a mark recognized by the system as being such. This integration threshold is permanently set by the manufacturer.

These concerns have hindered the ability to verify vote results, and have generally had a negative impact on impressions of vote integrity.

To some extent these problems have been addressed by DRE systems. Voter intention in a DRE system is a binary input from a digital device so ambiguity cannot exist. However, it is well known that processing errors, computer memory corruption or computer memory loss can occur in digital devices and there have been well publicized reports suggesting that this may be the case with some prior art DRE systems. If this type of failure were to occur, voter intention is permanently corrupted or lost and a new election would have to be held.

In addition to the aforesaid disadvantages, the prior art solutions generally do not enable an election official to effectively audit voting results and/or verify the integrity of the vole. For example, the above mentioned prior art technologies do not permit an election official to pick a ballot at random and examine the results of the optical scan algorithms that determined voter intent. This ability to compare the paper ballot with the results collected by a vote system allows the election official to verify the accuracy of each voting unit and ensure that there are no random or systematic tabulation errors in the voting system or subsystems.

There is a need for a voting system and ballot collection apparatus that enables objective measurement of voter intention and a method to verify accurate data collection to demonstrate the integrity of the vote.

SUMMARY OF INVENTION

A tamper-proof and secure ballot box includes a slot that permits paper ballots (which include one or more voter selection entry areas to be manually completed by a voter using a suitable marking device) to be fed into the box by means of a paper feed mechanism.

The interior of the box includes a ballot processing device. The ballot processing device includes a computer and a digital scanning device. The ballot processing application of the present invention is loaded on the computer. The digital scanning device scans each paper ballot fed into the box to create a digital image thereof, in a manner that is known.

The ballot processing application analyses each digital image based on predetermined criteria. The predetermined analysis criteria include co-ordinates of marking locations, co-ordinates of ballot identifiers, locations of relevant scripts, and pixel-based threshold values for determining voter intent (marked, unmarked, ambiguous).

The ballot box includes an alarm device that signals incorrect ballots or when a ballot has been determined to require resolution of intent by the voter (erroneous or ambiguously marked voter selection entires). In this case, the ballot is returned by the feeding mechanism, following which normal procedures are followed to cancel the ballot and issue a new ballot to the voter.

Another aspect of the invention is that the ballot processing application creates a "vote stamp" based on analysis of each digital image. This vote stamp is attached to a digital image of the scanned ballot and stored as a single data file to a memory linked to the computer. The vote stamp may include a randomly assigned unique identifier corresponding to a particular digital image of a ballot. The vote stamp also may include data corresponding to the results of the analysis of the digital image conducted by the ballot processing application. Another aspect of the vote stamp is that it may include other data relevant to the election process such as the polling station where the particular ballot was scanned.

The paper ballot is retained within the ballot box of the present invention in a secure manner and then handled in accordance with the specific rules of the election in which the ballot box is used.

The various data files corresponding to the digital ballot images and corresponding vote stamp are stored in the memory in random order. The voting selection of a particular individual cannot be discerned by individuals observing the order in which ballots are fed into the ballot box.

The computer also includes a suitable back-up storage device and related utilities to reduce the risk of data loss from the memory.

The system of the invention includes, a central processing computer. The memory linked to the computer consists of a computer cartridge. Data from a plurality of computer cartridges from a plurality of ballot boxes is retrieved and stored to a central memory linked to the central processing computer.

One aspect of the present invention is that the association of the vote stamp with the corresponding digital image enables rapid and cost effective verification of the integrity of the processes. For example, a random selection of a defined percentage of ballots processed in accordance with the invention can be examined for accurate collection of voter intent by calling up from the central memory the digital images and corresponding vote stamps. (for example from ballots received in a particular polling station) and by comparing the digital image displayed on a computer screen with the results of the processing thereof as shown by the data included in the vote stamp.

Another aspect of the present invention is that it provides the objectivity and speed of a digital process in connection with the use of paper ballots in an electoral process. A written record of the electoral choice in the form of the paper ballot is maintained as well as a cost savings as fully electronic voting (for example using touch screens) is generally more costly.

One object of the present invention is to provide a system and method that enables an electoral process that can be audited efficiently, accurately and transparently.

Another object of the present invention is to include the aforesaid auditing capabilities in a machine that can be easily accessed by any persons with visual, motor or language disabilities.

BRIEF DESCRIPTION OF THE DRAWINGS

A detailed description of several embodiments of the present invention is provided herein below by way of example only and with reference to the following drawings, in which.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

One aspect of the present invention is a method that includes the following steps:
1. Establishing one or more criteria for analyzing a plurality of paper ballots, the paper ballots including one or more voter selection areas, which criteria include threshold values for determining whether a particular voter selection area has been filled in, has not been filled in, or it is ambiguous whether or not it has been filled in;

2. Scanning at least one of the paper ballots using a scanning device, the scanning device generating a digital image document of the each paper ballot;

3. Analyzing the digital image document to determine whether a particular voter selection area has been filled in, has not been filled in, or is ambiguous as to whether or not it has been filled in, so as to define a series of processing results for each digital image;

4. Creation of a vote stamp which includes the processing results and attaching the vote stamp to the digital image document; and 5. Comparing the processing results with the digital image document corresponding to a paper ballot, thereby enabling the election results to be audited on a per ballot basis.

A further aspect of the method of the present invention is that the threshold values are based on pixel count. The threshold values are established by election officials, as particularized below.

In another aspect of the invention, the vote stamp includes other data relevant to the election process such as the polling station where the particular ballot was scanned.

Figure 1A:
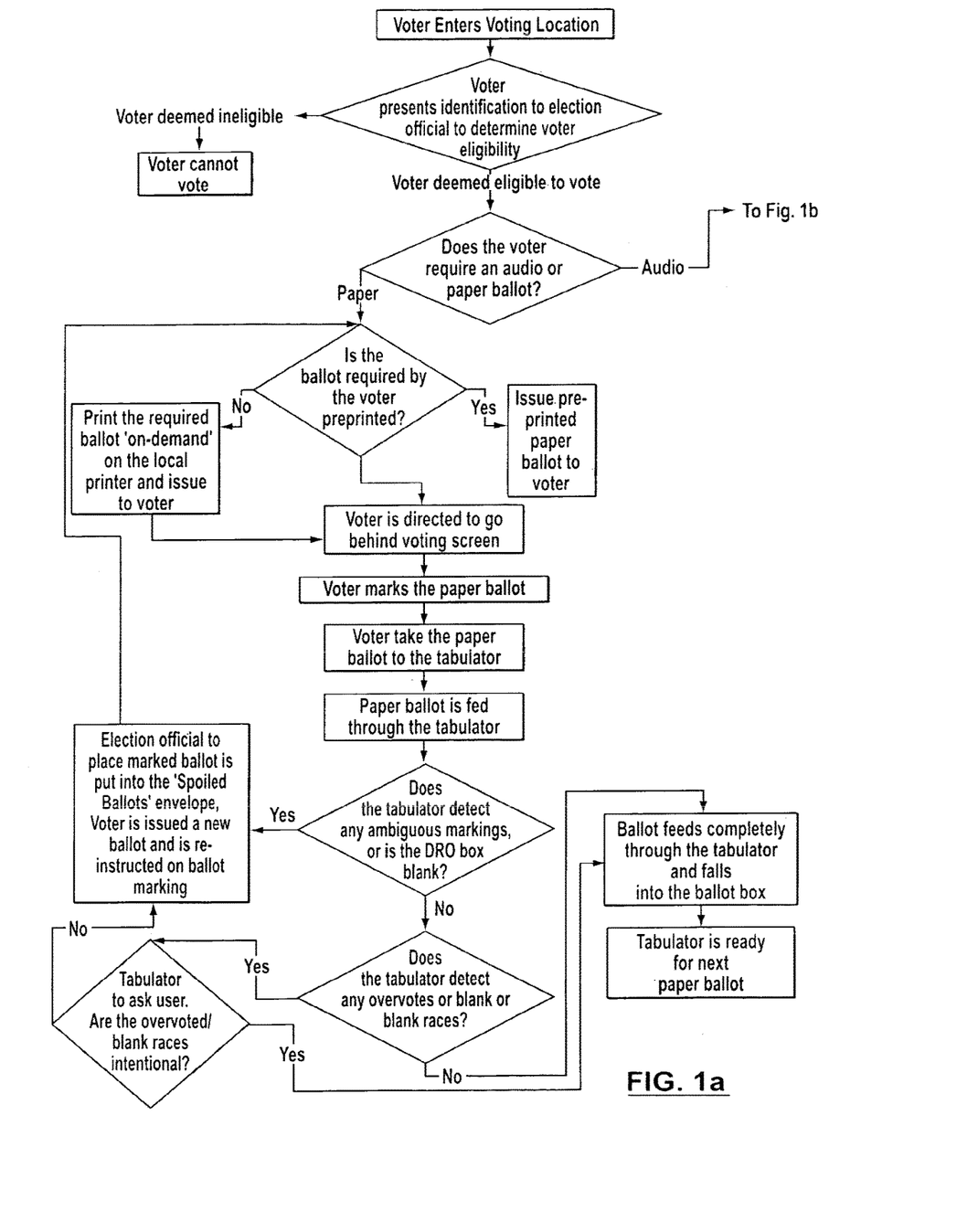
FIG. 1 is a flowchart illustrating the method of the present invention, in accordance with one particular aspect thereof.
Figure 1B:
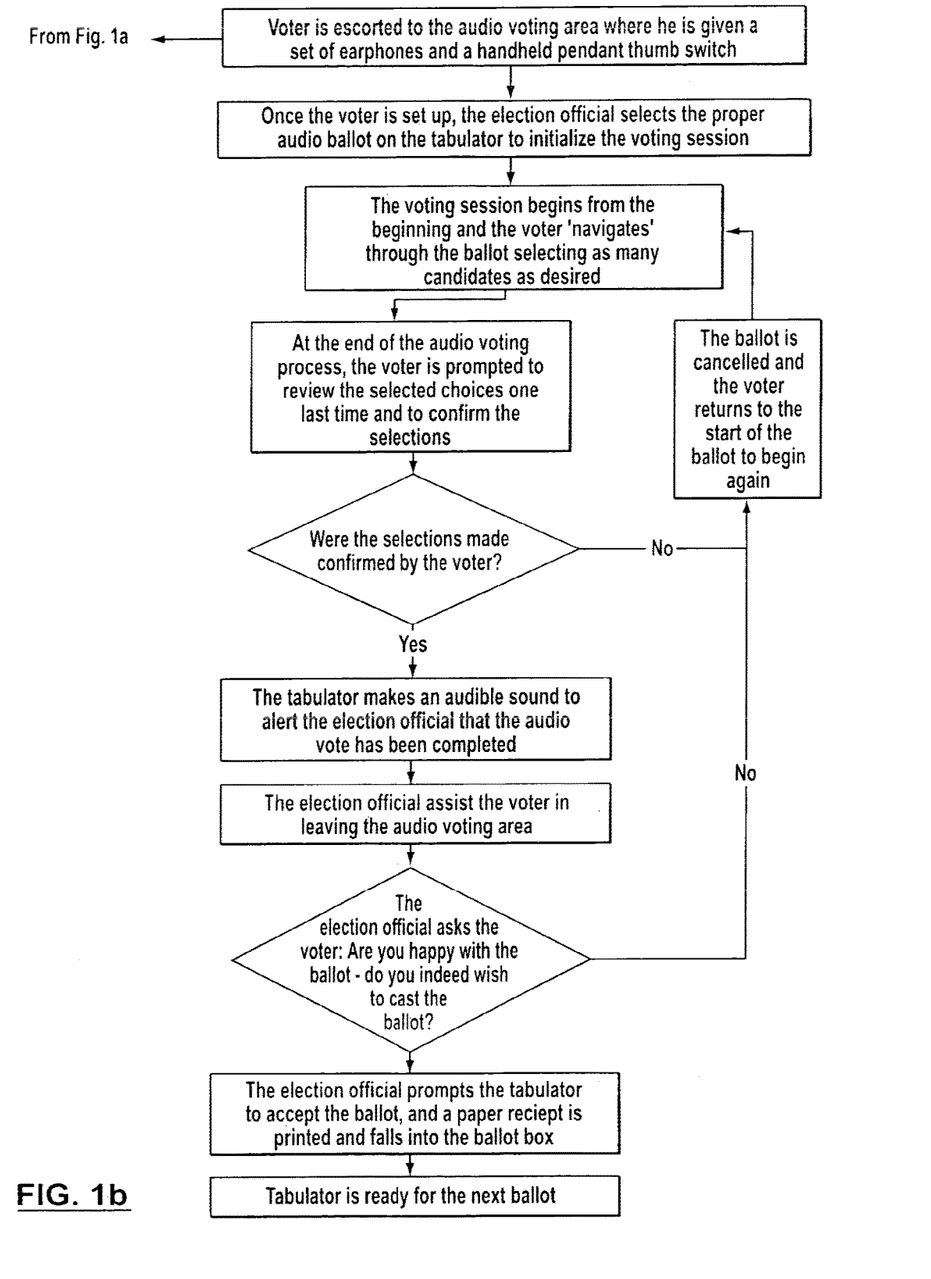

Further aspects of the method of the present invention are explained below. Overall, the method of the present invention is illustrated in FIG. 1.

Figure 2:
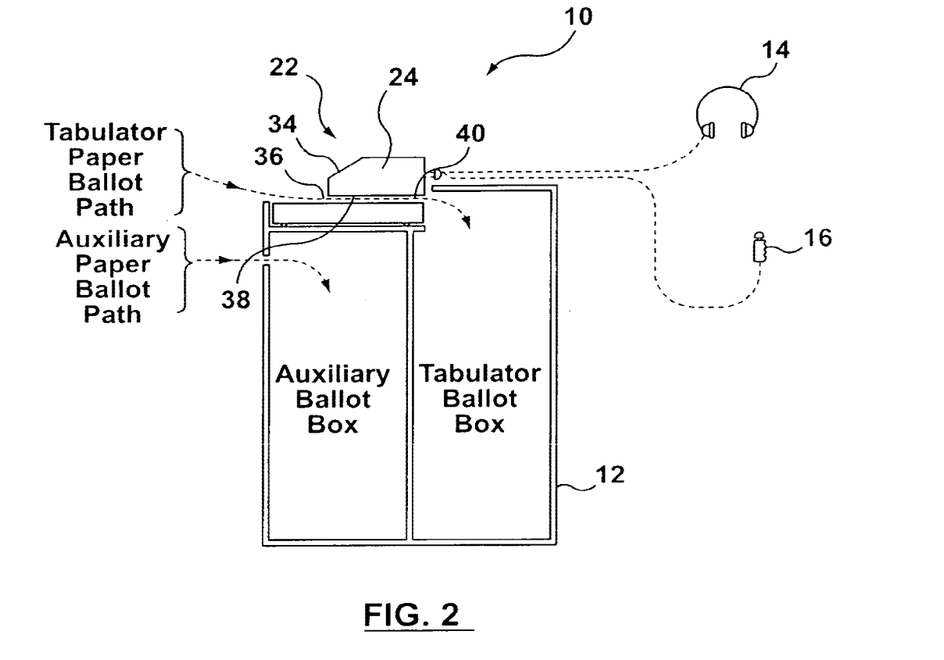
FIG. 2 is an illustration of the tabulation unit of the present invention, in a cross-section thereof.

FIG. 2 illustrates one particular embodiment of the invention which consists of a hybrid paper/electronic vote tabulator 10. The hybrid paper/electronic vote tabulator or tabulation unit 10 includes a lock down type ballot box 12, earphones 14, and a pendant manual trigger 16.

As voters come into the polling location, they are generally processed by the election official who determines voter eligibility (based on local election rules), and also determines the proper ballot for the voter. Based on the voter's requirements; they are either issued a paper ballot, or issued an 'audio' ballot, in accordance with one aspect of the present invention.

Figure 3:
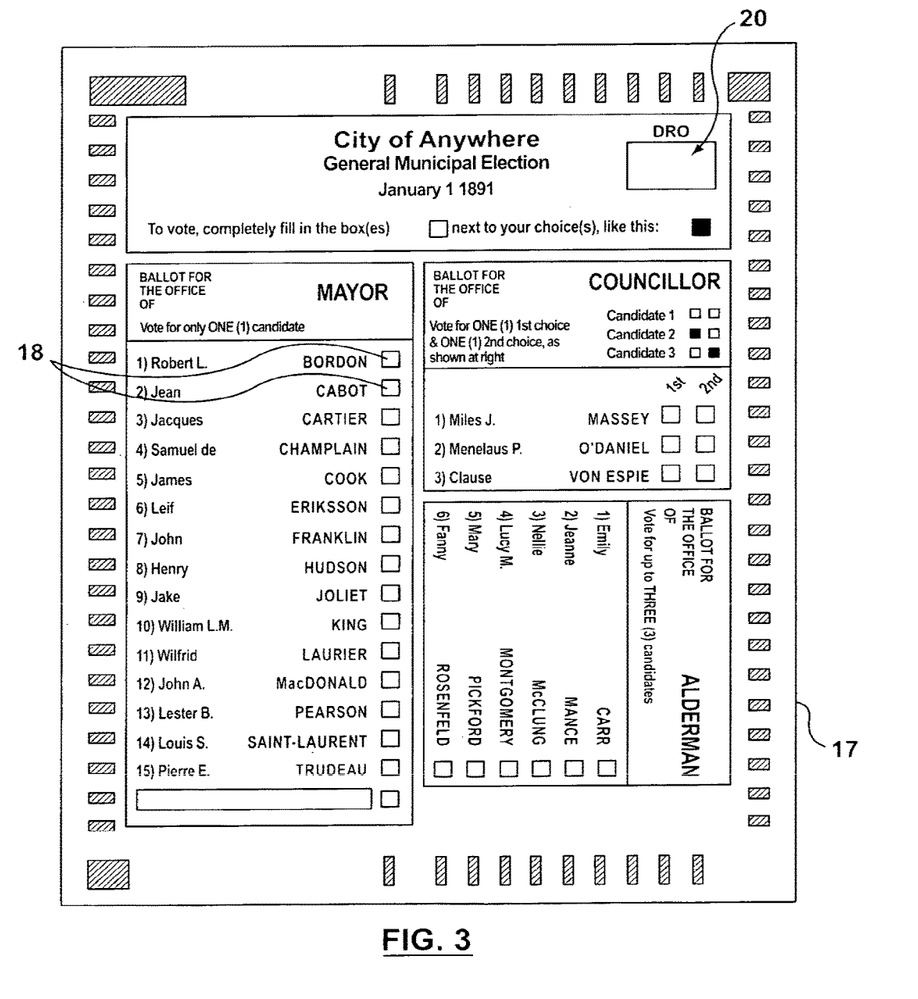
FIG. 3 is an illustration of a paper ballot that provides an example of a paper ballot processed in accordance with the present invention.

FIG. 3 illustrates a representative paper ballot 17, which includes a plurality of voter selection areas 18. In the case of the particular paper ballot 17 illustrated, there is also an election official area 20, which appears in most ballots, and is used by the election official to validate the particular ballot. Usually the validation takes the form of a signature in the election official area 20 by the election official, however, other means of authentication can also be used. The election official area 20 serves to mark the paper ballot 17 as having been officially issued.

It should be understood that the paper ballots 17 can either consist of pre-printed ballots or a ballots printed locally on-demand by means of a regular laser printer.

The voter will generally take the validated blank paper ballot 17 to a private area (such as a desk with privacy barriers), and make a mark or marks (this can be done in numerous ways such as filling in a box, making an 'X', etc) beside the chosen candidate(s) with a permanent marker.

For the sake of clarity, this disclosure generally refers to selection of a candidate or candidates, however, some votes relate to other questions such as referendum questions and the like. The present invention extends to votes obtained for a voter mandate on all matters whether candidates, weighted candidate votes, referendum questions and the like.

The voter then generally takes the marked paper ballot 17 to the tabulation unit 10, where it is fed through the hybrid tabulator 10, as shown in FIG. 2. Secrecy of voter intent is preferably maintained by using a confidentiality folder made from paper (not shown). The tabulation unit 10 includes a ballot processing device 22. The ballot processing device 22 includes a computer (not shown) and a ballot reader or digital scanning device 24. The ballot processing device 22 also includes a known paper feed mechanism 26. The ballot 17 is fed through the paper feed mechanism 26 and the digital scanning device 24 takes a high resolution optical scan of the ballot 17. In one particular aspect of the invention, the tabulation unit 10 takes the resulting high resolution scanned image (not shown) of the entire ballot 17, and saves one copy of this image to non-volatile memory (not shown) linked to the computer (not shown) so as to create a permanent record thereof.

Loaded on the computer is the ballot processing application 28 which constitutes the computer program aspect of the present invention. The ballot processing application 28 randomly assigns a filename to each scanned image (not shown) to ensure that the order in which the ballots 17 were scanned remains private. The ballot processing application 28 also sends another copy of the images (not shown) to the computer (not shown) for image recognition.

In a particular aspect of the invention, the computer (not shown) is linked to the digital scanning device 24, and the ballot processing application 26 defines an image recognition routine (not shown) that is applied to the digital scanning device 24. One aspect of the image recognition routine (not shown) is that the ballot processing application 28 enables the computer to selectively recognize specific areas of each image (not shown) and analyze such specific areas as particularized below to define a series of processing results (not shown) associated with the particular ballot 17.

For example, the ballot processing application 28 enables the computer to analyze the various security markings on the ballot 17 to ensure it is a valid ballot, perform a pixel count check to verify that the election official area 20 was initialled by the election official to ensure the ballot was properly issued to an eligible voter, and perform a pixel count of each voter selection area 18 on the ballot 17. In addition, as further examples of such processing results (not shown), depending on the pixel count of each marking box, the mark is either classified as a 'vote', a 'non-vote', or an 'ambiguous marking'. These classifications are based on the total pixel counts of the marking areas ("marking area" or "marking areas" refer for example to voter selection areas 18 or election official areas 20 and other similar areas) of the ballot, and the corresponding pixel levels defined by the election officials at a given time prior to the election. The election officials clearly define, in pixels, the minimum pixel count that is to be classified as a 'vote', the maximum pixel count (if any) that is to be defined as a definite 'non-vote', and a range of pixels in between those values that will constitute an 'ambiguous marking'. These pixel values are loaded on each tabulation unit 10. After calculating these pixel values for each marking area, the tabulation unit 10 will return the ballot (by operation of the paper feed mechanism 26) to the voter with an appropriate error message for any of the following scenarios (as a particular illustration of the present invention):

any marking area was classified as an 'ambigious marking';

too many marking areas in one category Were classified as 'votes' resulting in an "over-vote";

no marking areas in one or more category were classified as 'non-votes', resulting in a blank ballot; and/or no pixel count was recorded in the election official area 20, indicating that the ballot was not initialed by an election worker.

It should be understood that the tabulation unit 10 can be programmed to allow a voter to verify its ballot in the case of over-voted or blank ballots, thus preserving the voter's right to cast an over-voted or blank ballot.

If the ballot was not returned w the voter for any of the above reasons, the computer (not shown) determines that all of the votes pertaining to the particular ballot 17 have been cast by that ballot, and appropriately increments a main counter (not shown) that forms part of the memory (not shown), in a particular embodiment of the present invention.

Figure 4:
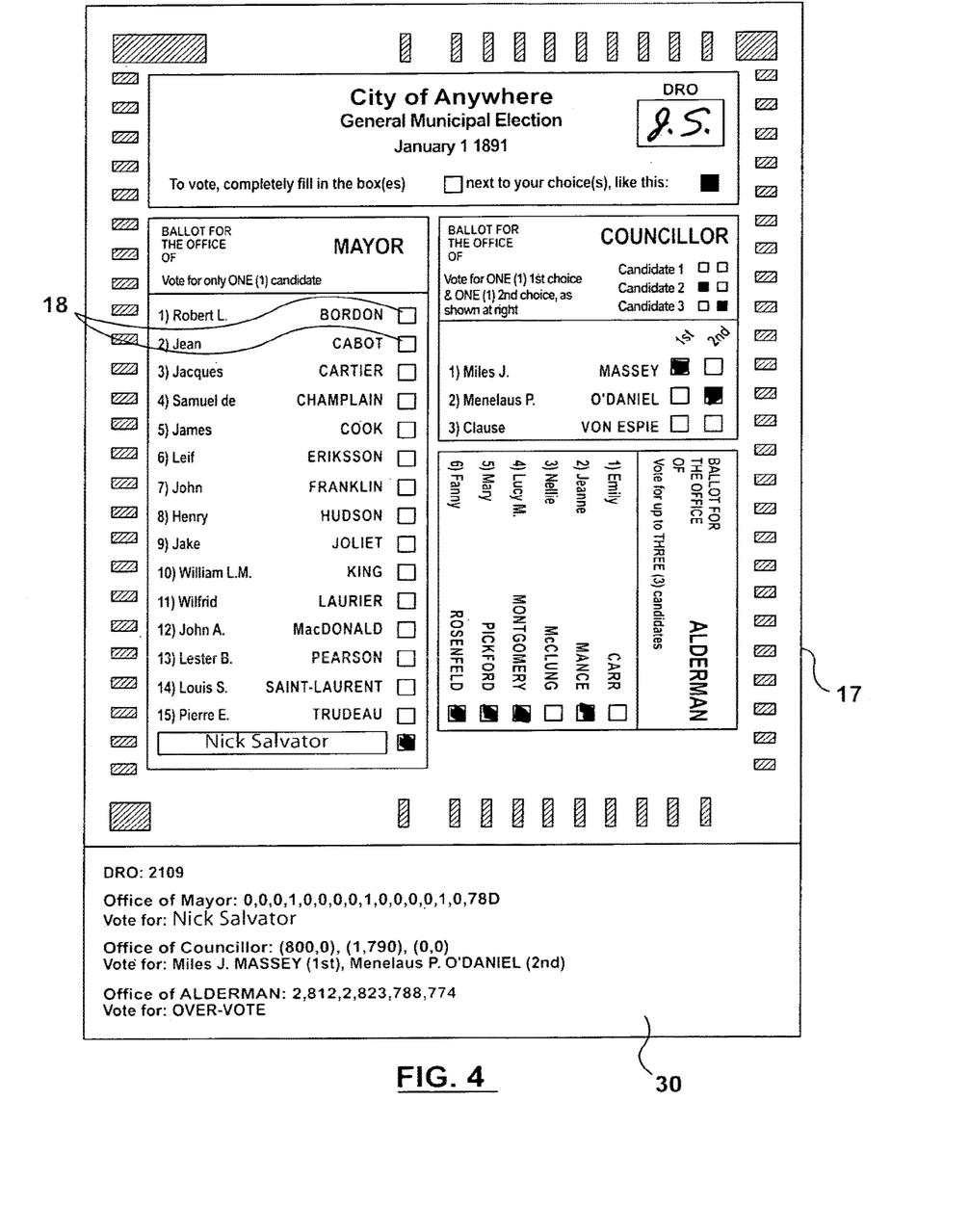
FIG. 4 illustrates a scanned and processed image of the paper ballot illustrated in FIG. 3 that includes the vote stamp footer of the present invention.

In addition, once the determination of the total votes for that ballot 17 has been made, by further operation of the ballot processing application 28, the computer (not shown) appends a footer 30 to the saved ballot image (not shown), which contains all of the processing results (not shown) for that specific ballot 17, as shown in FIG. 4. The footer 30 can also be understood as a "fingerprint" or a "vote stamp" that is attached to each image (not shown). The present invention thereby permits the creation of one random, clear, image of every ballot 17 along with all the information the tabulation unit 10 has compiled for that particular ballot 17 that can be later viewed by any software image viewer (not shown).

Upon successful completion of the ballot processing, in accordance with the present invention, the ballot 17 is passed the rest of the way through the tabulation unit 10, where it drops into the ballot box 12, where it mixes freely with the other ballots to preserve the anonymous ordering of the ballots (as shown in FIG. 2).

In a particular aspect of the present invention, means is provided for voting by an individual with a challenge such as visual impairment, illiteracy, inability to read the language in which the ballot is written, physically impairment with only limited motor abilities, etc. In such case, in accordance with another aspect of the method of the present invention, the election official initializes an 'audio ballot' (not shown) which is administered directly by the tabulation unit 10 (in one particular embodiment thereof). By operation of another aspect of the ballot processing application 28 of the present invention, the election official initializes, or activates, the audio ballot by using an electronic key (or some other suitable mechanism), and ushers the voter to a voting area where the voter can put on the ear phones 14 and take hold of the handheld pendant that includes the manual trigger selector 16. The audio ballot (not shown) is best understood as an audio version of the ballot 17, which is stored to the memory (not shown) associated with the computer (not shown).

The voter negotiates through the ballot 17 through the audio interface and makes candidate selections via the manual trigger 16. Every time the voter makes a selection, and every time a voter completes voting for every individual race, the computer (not shown) asks the voter to confirm the choices after it is audibly reviewed. Upon completion of the audio ballot, a final review is read back to the voter, and the voter is asked one more time to confirm the selected choices. This audio clip of this review, along with the subsequent sound of the voter confirming the review, is recorded and randomly stored in memory (not shown) by operation of the ballot processing application 28. In addition, once the voter is finished with this final review, the election official gives the voter one last chance to cancel the ballot and start over. Once this option has been denied by the voter, the election official uses their electronic key to cast the audio ballot. By doing so, the votes from that audio ballot are appended to the ongoing tally of the tabulation unit 10 (as particularized above), the sound bites are saved to the memory, and optionally a printer linked to the computer (not shown) prints the votes summary of the audio vote onto a paper chit. The chit then falls into the ballot box 12 in order to maintain secrecy or is printed in encrypted form for audio playback on either the tabulation unit 10 or external device. This aspect of the method of the present invention is also illustrated in FIG. 1.

Figure 5:
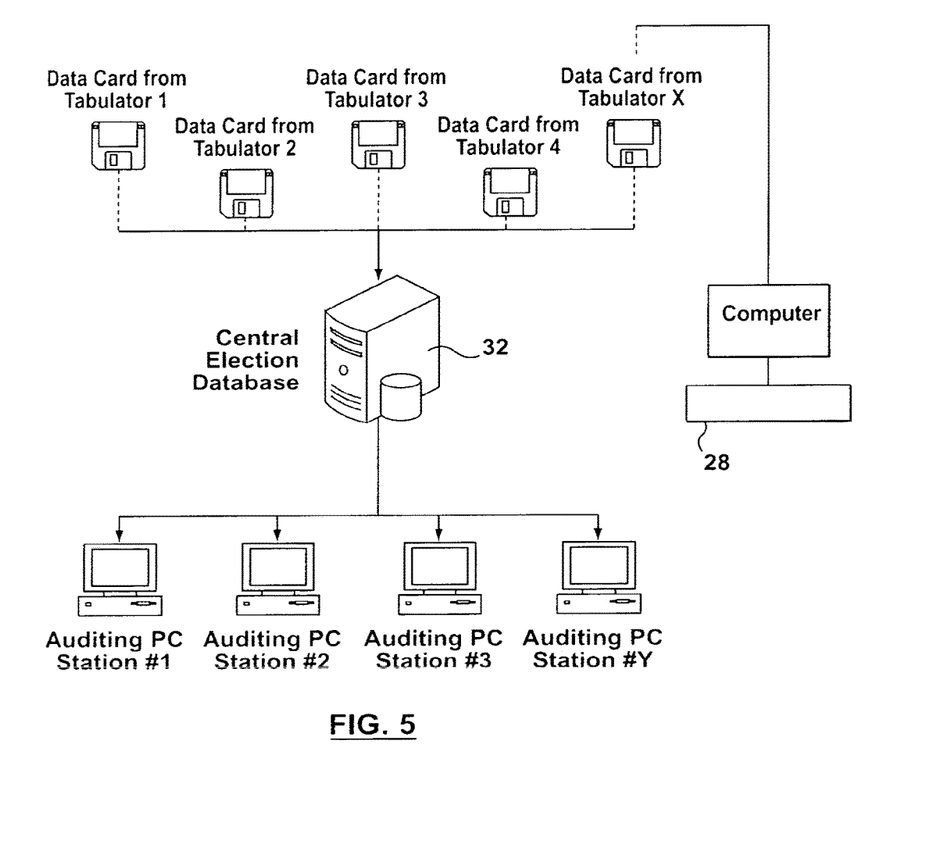
FIG. 5 is a diagram illustrating a system architecture representative of one embodiment of the system of the present invention.

At the end of voting, the tabulation unit 10 includes an ongoing tally for all the ballots that passed through that particular machine, and those results are transmitted (by various known methods and technologies) to a central location which includes a central election database 32, as illustrated in FIG. 5. The various election results from the various tabulation units 10 are summed together in a manner that is known and stored to the central election database 32, in a manner that is known.

It should be understood that one aspect of the present invention is a system consisting of the tabulation unit 10 of the present invention, and which includes the computer (not shown) and the ballot processing application 28. Another aspect of the present invention is a further system consisting of a plurality of tabulation units 10 linked to a central computer (not shown), the central computer (not shown) being linked to the central election database 32.

The system and computer program aspects of the present invention can be provided in a manner that is known to those skilled in the art. Particular hardware and software components are described below for illustration purposes.

Technical Description of the Tabulator Hardware

The tabulation unit 10 is generally a self-contained unit made up of several different subcomponents. The following is a list and description of representative subcomponents.

Motherboard

In one particular aspect of the present invention, the ballot processing mechanism 22 includes a motherboard that provides the functional block of the tabulation unit 10, and which controls electronic processing of the tabulator process. The motherboard (not shown) preferably includes several interfaces, including an interface with the paper feed mechanism 26, an audio/general purpose input output (GPIO) interface, a scanning card and image heads (associated with the digital scanning device 24), the power supply board, a thermal printer, and the user interface 34 illustrated in FIG. 2.

The motherboard (not shown) includes the computer (not shown) consisting of a known microprocessor. The motherboard (not shown) along with its processor (not shown) can be made to operate with a variety of software operating systems, but currently is utilizing either WINDOWS™ CE.Net or uClinux™. The processor (not shown) may consist of an x86 INTEL™ based processor (for the Windows CE.Net version) or, for example, a MOTOROLA COLDFIRE™ processor (for the uClinux™ version). The motherboard (not shown) has various sources of memory including, for example, onboard flash memory where the operating system kernel resides, as well as various hard drive options including an on-board ATA flash drive and a removable compact flash drive.

Paper Feed Mechanism

The paper feed mechanism 26 is that part of the tabulation unit 10 that physically controls the movement of the paper ballot through the tabulation unit 10. In a particular embodiment of the present invention, the paper feed mechanism 26 is of a very similar in construction to today's modern sheet-fed scanning systems (or sheet-fed fax machines) in that it incorporates a system of rubberized wheels connected to a stepper motor that are responsible for advancing the paper either forward or backward through the paper feed mechanism. The paper feed mechanism 26 also houses a object sensor system which is a series of LED/photo-detectors used to detect a sheet of paper that has been inserted into the opening slot of the paper feed mechanism 26. Also included on the paper feed mechanism 26 is a double paper sensor, which is a commercially available module that is capable of detecting more than one sheet of paper. Lastly, the paper feed mechanism 26 also houses two separately packaged contact image sensor (CIS) units (one above the paper feed plane, and one below allowing for duplex imaging), which are commercially available and in large scale use in commercial fax and scanning machines. The paper feed mechanism 26 is preferably designed in such a way as to allow the rubber wheels to advance and reverse the paper through the paper feed mechanism and across the mounted CIS units in such a manner as to allow no more than 7 degrees of paper skew, and in such a manner as to ensure that the paper does not bind with any part of the tabulator, thus ensuring that the paper does not jam inside the tabulator.

The opening slot 36 of the paper feed mechanism 26 is extended out through a front slot 38 of the ballot box 12 for the insertion of the paper, and a rear slot is 40 extended through the rear wall of the paper feed mechanism ensuring that the paper is able to freely exit the paper feed mechanism and fall directly into the ballot box 12.

Scanning Card and Image Heads

The digital scanning device 24 of the present invention preferably includes a series of imaging heads or modules (not shown), which can be either be of the contact image sensor (CIS) or charge coupled device (CCD) type. When prompted, each imaging module (either CIS or CCD) takes a one dimensional image of the ballot paper that is in direct contact with the module, producing a series of black and white or grey-scale pixels that represent the image for that particular line of the paper. By coupling this process with a single line advance of the stepper motor (i.e. advancing the paper by one line) and repeating, a very high quality two dimensional image of the entire sheet of paper is created. The imaging modules interface directly with the image controller. In one form of the tabulation unit 10, this controller is in the form of a separately mounted custom printed circuit board (PCB). This board contains an application specific integrated circuit (ASIC) chip that has been designed for specific use in scanning applications. This chip is commercially available and is in wide use in commercial scanning products. In its other form, this imaging controller resides directly on the Coldfire processor which is located on the main motherboard. In this version of the controller, the software (hat is encoded on the ASIC chip is ported directly onto the main processor, thus eliminating the need for a separate PCB. In either case, the imaging controller is one particular aspect of the ballot processing application 28 of the present invention.

The function of this imaging controller is to control the feeding and scanning of each ballot 17. When 'armed' (i.e. the main tabulator application sends the signal to the image controller to be ready to accept and scan ballots) the image controller monitors the paper sensor hardware. When a ballot 17 is inserted into the opening of the tabulator (i.e. the front of the paper feed mechanism system 26), the paper sense hardware trips, and sends the signal to the image controller to start the scan routine. In this scan routine, the image controller repeatedly triggers the imaging modules to scan a line and then advances the paper feeding wheels (i.e. via the stepper motor) and repeats until the paper has been completely scanned. When the paper is completely scanned, two complete images are sent by the imaging controller to the main tabulator application for processing. During this time, it is important to note that the paper has not been completely fed through the paper feed mechanism. Even though the ballot has completely passed over each imaging head, the bottom piece of the ballot is still being held by the rear rubberized wheels. It is at this point where the imaging controller awaits instructions from the main processor or computer (not shown) for its next instruction. This next instruction can be either to completely return the ballot to the voter (i.e. reversing the direction of the stepper motor allowing the rubberized wheels to move the paper back through the machine and out the front slot) or to accept the ballot (i.e. forwarding the stepper motor a predefined number of steps to allow the ballot to continue through past the rear slot 40 of the tabulator, allowing the ballot to fall into the ballot box). After this instruction, the controller will 're-arm' itself in preparation for the next paper ballot until such time as the main tabulator application tells it to turn off.

Power Supply

The power supply is generally a separate PCB that converts the incoming power voltage (either 120 VAC, 240 VAC, or 30 VDC) to a DC voltage that is required by the other PCB's in the tabulator. Specifically, −5 VDC, +5 VDC, +12 VDC and −12 VDC are the outputs of this PCB, and are used to power the motherboard, the scanning board, the user-interface module, and the thermal printer.

Audio/GPIO Card

The audio/GPIO card is either in the form of a separate PCB, or built-in on the motherboard. Its function is to provide an audio output and a GPIO input to the motherboard. The card interfaces to two mini 3.5 mm connectors that are mounted on the rear plate of the tabulator; one is where the earphones 14 plug in, and the other is where the handheld pendant that houses the manual trigger 16 plugs in. This card allows the main application to play various sound files via the earphone jack, and accept user input via the handheld pendant.

Thermal Printer

This is a commercially available thermal printer which interfaces directly with the motherboard, in one particular embodiment of the present invention mentioned above. The printer is mounted in such a way that the paper output is aligned with a slot in the tabulator cover, allowing the printed piece of paper to feed through the tabulator cover to the outside. When sent a print job by the motherboard, the printer produces a printout on a thermal paper roll.

User Interface

The user interface 34 is a known interface device mounted to the tabulator cover, which possesses both an information display screen and a method of user input. In a preferred embodiment of the present invention, there are currently two different types of this module. The first is a TFT display screen coupled to a resistive touch-screen input device. Both are commercially available pieces of hardware. The second type of user-interface module available is a module that possesses an LCD display screen with several keypad buttons. Both modules interface directly with the motherboard, and are controlled by the ballot processing application 28. It is through this device that election officials are able to interface with the tabulator. This interface is used for a number of situations, including entering administrative passwords, setting up audio ballots, final casting of audio ballots, printing various types of election reports, accepting or returning over-voted or blank ballots, etc., which constitute further functions of the ballot processing application 28.

Chassis and Exterior Package

The chassis is made up of a metal base and metal rear panel which is mounted to the base at 90 degrees. The power supply PCB, the scanner PCB, the motherboard PCB, thermal printer and audio/GPIO board are all mounted to this metal chassis. The paper feed mechanism is then mounted to the base as well, but sits above the above other modules. The user interface module is fastened to the paper feed mechanism cover (which can be either plastic or metal) which in turn fastens to the metal base and rear plates via tamper-proof security screws (i.e. torx screws).

Description of Scanning Software

As mentioned above, one aspect of the ballot processing application 28 of the present invention is an application layer that calls the scanning function that points to a matrix. When a ballot 17 is scanned a driver of the ballot processing application 28 is responsible to copy the digital scan of the document to a specified location on the memory (not shown).

When the scanner is enabled it is in ready/active mode and will await the insertion of a ballot 17 in the scanner. In this mode of operation, the digital scanning device 24 will await the insertion of a ballot to begin the scan. The operation of the scanner and driver during the scanning process is outlined below:

1. When a ballot 17 is inserted into the digital scanning device 24, the front
   Object Sensor will send a signal to the scanning board which will notify the driver. If the driver is in active mode, it will start scanning the document.
2. At the start of each line scan, the driver will send a 'start pulse signal' to the CIS module (where a CIS module is used, as explained above). This prompts the CIS module to place an analog output voltage on its Vout pin that is representative of the darkness of the first pixel. This is followed by a sequential series of Vout voltages for each of the pixels in the line. These signals are spaced by the internal CIS clock, which is set by the driver. As the digital scanning device 24 is going through its line scan, the scanning board will convert each voltage signal to a digital signal, in a manner that is known. The threshold value of this quantization is configurable.
3. The resultant digitized image (not shown), again, is stored in the predefined location of the memory (not shown).
4. When the back Object Sensor is triggered, the scanning board will notify the driver. At this point the driver will notify the application layer (via a function call) that the document has been scanned, imaged, and is sitting in matrix form in memory. The driver will also, via this function call, let the application know the size of the matrix. Here, the driver will be put in a wait state. It will wait for instructions from the application layer.
5. A driver defined API is provided so that the application can then instruct the driver to either pass the document completely through (forward) the digital scanning device 24, or completely reverse the direction of the stepper motor, returning the entire document back through the front of the unit.

Also if the driver detects any errors in the document (i.e. double sheet, paper jam, etc.) then it will reverse the document and notify the application layer of the error. During this disabled state the driver will disregard the beginning of document signal from the device and not scan any documents (i.e ballots). The digital scanning device 24 is initially in this inactive state. It will be in this state until the initialization routine is complete and everything is okay. It can be put back in this inactive state by the application layer.

The overall speed of a scan from once the paper is sensed to when the driver notifies the application layer that a ballot 17 has been scanned is generally under one (1) second, using existing technology, which is suitable for the purpose of the present invention.

The driver described will generally allow the scan of any sized document up to a maximum of 21 inches long.

Description of Random Auditing Process

As described above, once the vote has been completed, the vote result files are transferred to the central election database 32. Election officials can now perform a random auditing process, in accordance with another aspect of the invention, to ensure that the tabulation units 10 have functioned correctly (and also to verify the integrity of the vote overall). This can be in the form of a spot check, a structured check to gain a certain confidence rate in the tabulator integrity, or a complete check of every ballot cast.

For the sake of clarity, once the vote result files from each tabulation unit 10 have been transferred to the central computer (not shown), there will be one multimedia file for every ballot cast during the election, complete with the corresponding processing results (not shown) or vote stamped 'fingerprint' information. In the case of paper ballots, there is one image file for every ballot cast, and in the case of audio ballots, there will be one sound file for every audio ballot cast. Depending on the auditing strategy used, the auditing committee (for example) can have any number of terminals accessing the ballot files from the central election database 32, as illustrated in FIG. 5. Each auditor working on a separate computer can open as many ballot files as needed.

Audit Process

The process that allows auditors to verify that any given ballot was tabulated properly is as follows. As explained above, a complete image of each ballot 17 scanned is saved to the ballot file. In addition, the fingerprint of that ballot (which contains all the pertinent information that the tabulator obtained from that ballot, including pixel values for each marking area as well as which candidates where voted for) is vote stamped below that image by including same in the footer 30. By simply opening any given ballot file on their computer terminal, the election auditor is able to compare what the voter markings to the tabulator interpretation. In the case of the audio ballot, the election auditor can compare the sound file that the voter reviewed and confirmed with what the tabulator recorded for that ballot. Thus by simply opening one of these multimedia files, the auditor can verify whether the tabulation unit 10 made an error in tabulating that particular vote.

Figure 6:
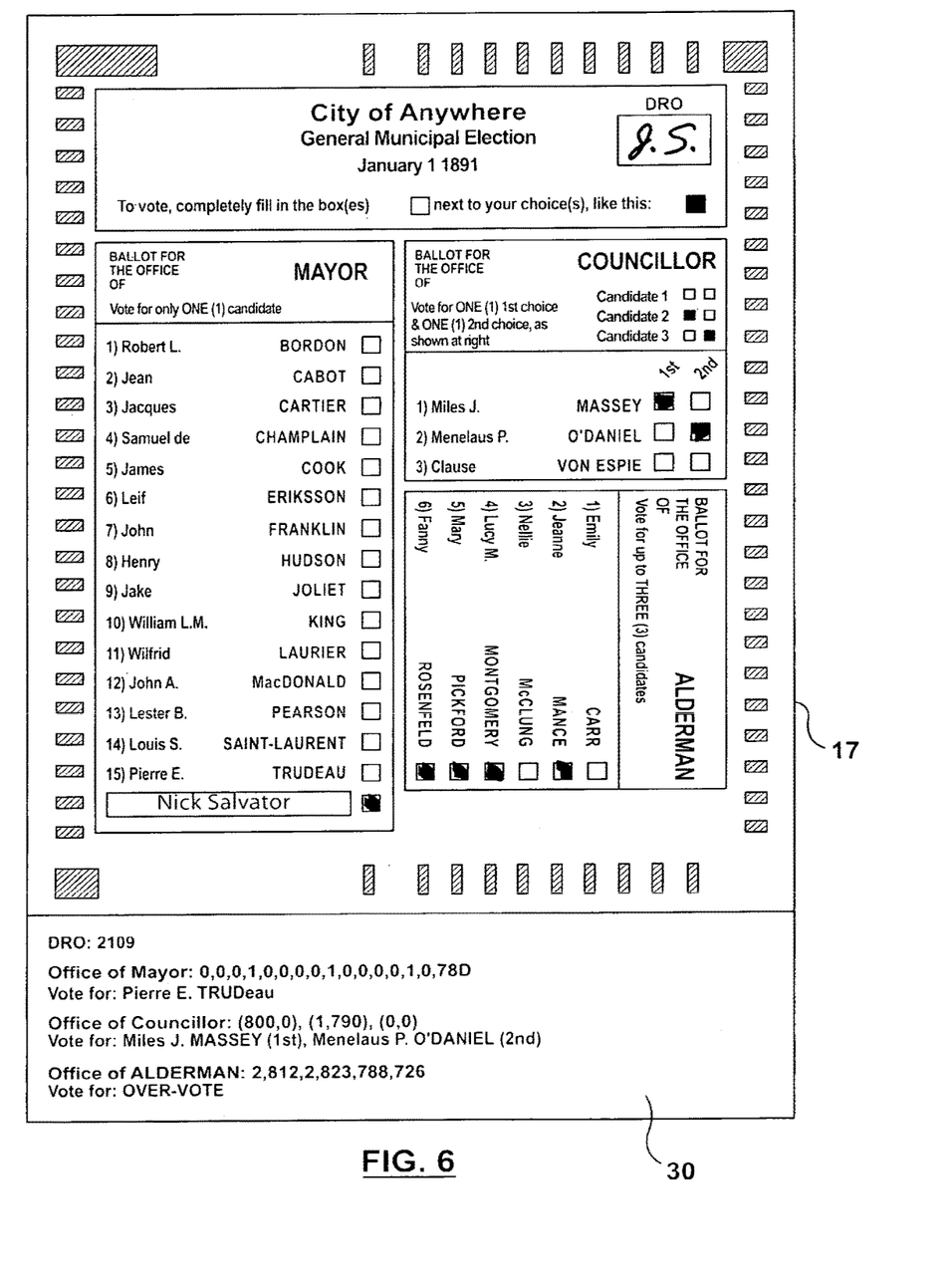
FIG. 6 is a further scanned image of another paper ballot that includes a vote stamp footer, wherein the vote stamp footer reflects processing results inconsistent with the voter intention.

In FIG. 6, we see an example of a ballot that was incorrectly tabulated. It is clear that the voter intended to vote for the write-in candidate 'Nick Salvatore', but the tabulator registered a vote for Pierre E. Trudeau. In essence, to verify that one ballot has been tabulated correctly takes only a few seconds.

Types of Auditing Strategies

The main advantage of this type of fingerprinting and corresponding audit trail is that it easily enables virtually any auditing strategy. On the one extreme, perhaps only one or two ballot files from each tabulation unit 10 would be checked to verify that the tabulator fingerprint matched the original ballot information. This would provide some degree of a sanity check against a systematic problem, but depending on the number of ballots cast at each tabulator, would generate a fairly low confidence rate on the auditing process.

On the other extreme, would be a 100% confidence rate on the audit. For this, every single ballot file would be opened to confirm that the tabulator fingerprint matched the original ballot information. However, depending on how many ballots had been cast during the election and how many audit workers were available to carry out the auditing, this process could be too slow.

It should be understood that the present invention can be used in many voting scenarios, including for example shareholder votes and the like. Specific aspects of the hardware and software described can be modified without departing from the system and computer program aspects of the present invention.

What is claimed is:

1. A method for recording votes for voter-marked paper ballots, comprising:
   receiving, at a ballot processing computer, optical image data comprising an optical image of a voter-marked paper ballot;
   identifying, at the ballot processing computer, a selected candidate based on processing of the optical image data to determine one or more votes recorded on the voter-marked paper ballot, wherein the processing of the optical image data comprises:
      identifying a plurality of voter selection areas of the voter-marked paper ballot,
      performing a pixel determination for each of the voter selection areas, the pixel determination identifying pixels in the optical image that contain a voter marking,
      determining, based at least in part on the pixel determination, that a voter selection area associated with the selected candidate has been selected when markings in a portion of the optical image of the voter-marked paper ballot corresponding to the voter selection area meets a predefined first threshold value for determining a specific voter selection area has been selected, and
      determining, based at least in part on the pixel determination, that the voter-marked paper ballot includes at least one ambiguous mark when markings in one or more portions of the optical image data corresponding to one or more voter selection areas fall between the predefined first threshold value and a predefined second threshold value for determining a specific voter selection area has not been selected;
   generating, at the ballot processing computer, vote stamp image data comprising a visual representation of a name of the selected candidate that was identified based on the processing of the optical image data; and
   appending, at the ballot processing computer, the vote stamp image data to the optical image data to create a single image comprising the optical image of the voter-marked paper ballot and the vote stamp image data.

2. The method of claim 1, further comprising:
   storing the single image comprising the optical image data of the voter-marked paper ballot and appended vote stamp image data in a memory.

3. The method of claim 2, wherein the optical image data of the voter-marked paper ballot and corresponding vote stamp image data are stored in a single data file.

4. The method of claim 1, wherein the single image comprising the optical image of the voter-marked paper ballot and the vote stamp image provide a visual representation of the voter-marked paper ballot and vote stamp image when viewed by an image viewer.

5. The method of claim 1, wherein the vote stamp image data comprises all of the data related to the processing of the optical image data.

6. The method of claim 1, further comprising: auditing the identification of the selected candidate, the auditing comprising:
   viewing the single image comprising the optical image of the voter-marked paper ballot and the vote stamp image data; and
   comparing the visual representation of the name of the selected candidate recorded in the vote stamp image data with markings on the voter-marked paper ballot.

7. The method of claim 1, wherein the vote stamp image data is stored in a file format viewable using viewer software that is different than software used in one or more of the receiving, identifying, generating, and appending.

8. The method of claim 1, wherein the vote stamp image data includes identification of marks on the voter-marked paper ballot determined to be ambiguous marks.

9. The method of claim 1, further comprising:
   routing the voter-marked paper ballot to a first location when it is determined that the voter-marked paper ballot does not include at least one ambiguous mark; and
   routing the voter-marked paper ballot to a second location when it is determined that the voter-marked paper ballot does include at least one ambiguous mark.

10. The method of claim 9, wherein the first location comprises a ballot box.

11. The method of claim 9, wherein routing the voter-marked paper ballot to a second location comprises:
   returning the voter-marked paper ballot to the voter.

12. The method of claim 1, further comprising identifying an overvote when votes for a particular race exceed an allowed number of votes for the race, and wherein the vote stamp image data includes identification of the overvote.

13. A system for recording votes for voter-marked paper ballots, comprising:
   a processor; and
   a memory in electronic communication with the processor, wherein the memory stores executable instructions that when executed by the processor cause the processor to perform operations comprising:
      receiving optical image data comprising an optical image of a voter-marked paper ballot;
      identifying a selected candidate based on processing of the optical image data to determine one or more votes recorded on the voter-marked paper ballot, wherein identifying the selected candidate comprises:
         identifying a plurality of voter selection areas of the voter-marked paper ballot,
         performing a pixel determination for each of the voter selection areas, the pixel determination identifying pixels in the optical image that contain a voter marking,
         determining, based at least in part on the pixel determination, that a voter selection area associated with the selected candidate has been selected when markings in the voter selection area meets a predefined first threshold value for determining a specific voter selection area has been selected, and
         determining, based at least in part on the pixel determination, that the voter-marked paper ballot includes at least one ambiguous mark when markings in one or more voter selection areas fall between the predefined first threshold value and a predefined second threshold value for determining a specific voter selection area has not been selected;

generating vote stamp image data comprising a visual representation of a name of the selected candidate that was identified based on the processing of the optical image data; and appending the vote stamp image data to the optical image data to create a single image comprising the optical image of the voter-marked paper ballot and the vote stamp image data.

14. The system of claim 13, wherein the memory stores further executable instructions that when executed by the processor cause the processor to perform further operations comprising:

storing the single image comprising the optical image data of the voter-marked paper ballot and corresponding vote stamp image data in a memory.

15. The system of claim 14, wherein the optical image data of the voter-marked paper ballot and corresponding vote stamp image data are stored in a single data file.

16. The system of claim 13, wherein the memory stores further executable instructions that when executed by the processor cause the processor to perform further operations comprising:

outputting the single image comprising the optical image of the voter-marked paper ballot and the vote stamp image data to a user for auditing by comparing the visual representation of the name of the selected candidate recorded in the vote stamp image data with markings on the voter-marked paper ballot.

17. The system of claim 13, wherein the vote stamp image data is stored in a file format viewable using viewer software that is different than software used in one or more of the receiving, identifying, generating, and appending.

18. The system of claim 13, wherein the vote stamp image data includes identification of marks on the voter-marked paper ballot determined to be ambiguous marks.

19. The system of claim 13, wherein the memory stores further executable instructions that when executed by the processor cause the processor to perform further operations comprising:

routing the voter-marked paper ballot to a first location when it is determined that the voter-marked paper ballot does not include at least one ambiguous mark; and routing the voter-marked paper ballot to a second location when it is determined that the voter-marked paper ballot does include at least one ambiguous mark.

20. The system of claim 13, wherein the memory stores further executable instructions that when executed by the processor cause the processor to perform further operations comprising identifying an overvote when votes for a particular race exceed an allowed number of votes for the race, and wherein the vote stamp image data includes identification of the overvote.

* * * * *